(12) United States Patent
Kadam et al.

(10) Patent No.: US 8,140,642 B1
(45) Date of Patent: Mar. 20, 2012

(54) NETWORK CONNECTION-INDEPENDENT UPDATING SYSTEM AND METHOD

(75) Inventors: Sunil S. Kadam, Hillsboro, OR (US); Tianying Fu, Beaverton, OR (US); Mike Patrick Bacus, Tigard, OR (US)

(73) Assignee: McAfee, Inc., Santa Clara, CA (US)

( * ) Notice: Subject to any disclaimer, the term of this patent is extended or adjusted under 35 U.S.C. 154(b) by 934 days.

(21) Appl. No.: 10/150,608

(22) Filed: May 17, 2002

(51) Int. Cl.
G06F 15/16 (2006.01)

(52) U.S. Cl. ......... 709/218; 709/221; 717/171; 717/176

(58) Field of Classification Search .......... 709/202–203, 709/217–222, 227–228, 250; 717/168, 171, 717/176, 172, 177
See application file for complete search history.

(56) References Cited

U.S. PATENT DOCUMENTS

| | | | | |
|---|---|---|---|---|
| 5,937,041 A * | 8/1999 | Cardillo et al. | ............ | 379/93.25 |
| 6,167,567 A * | 12/2000 | Chiles et al. | .................. | 717/173 |
| 6,173,316 B1 * | 1/2001 | De Boor et al. | ............... | 709/218 |
| 6,269,456 B1 * | 7/2001 | Hodges et al. | .................. | 714/38 |
| 6,317,797 B2 * | 11/2001 | Clark et al. | ........................ | 710/5 |
| 6,336,142 B1 * | 1/2002 | Kato et al. | ..................... | 709/227 |
| 6,523,023 B1 | 2/2003 | Sonnenberg | ....................... | 707/3 |
| 6,629,145 B1 * | 9/2003 | Pham et al. | ..................... | 709/230 |
| 6,760,728 B1 * | 7/2004 | Osborn | ........................... | 707/10 |
| 6,829,481 B2 * | 12/2004 | Souissi | ......................... | 455/436 |
| 6,965,928 B1 * | 11/2005 | Cox et al. | ..................... | 709/220 |
| 6,965,948 B1 * | 11/2005 | Eneborg et al. | ............... | 709/250 |
| 6,985,936 B2 * | 1/2006 | Agarwalla et al. | ............ | 709/221 |
| 7,010,578 B1 * | 3/2006 | Lewin et al. | .................. | 709/217 |
| 7,039,656 B1 * | 5/2006 | Tsai et al. | ..................... | 707/201 |
| 7,062,765 B1 * | 6/2006 | Pitzel et al. | .................... | 717/177 |
| 2002/0120875 A1 * | 8/2002 | Kiwada et al. | ................ | 713/201 |
| 2003/0065777 A1 * | 4/2003 | Mattila et al. | ................. | 709/225 |

* cited by examiner

*Primary Examiner* — David Lazaro
(74) *Attorney, Agent, or Firm* — Wong, Cabello, Lutsch, Rutherford & Brucculeri, LLP

(57) ABSTRACT

A system, method and computer program product are provided for communicating over a network without a direct connection to the network. A process is first initiated on a first computer without a direct connection to a network. In response to the process, a second computer coupled to the first computer with a direct connection to the network is automatically identified. Data is then communicated between the first computer and a server computer over the network via the direct connection of the second computer.

25 Claims, 6 Drawing Sheets

NETWORK CONNECTION-INDEPENDENT UPDATING SYSTEM AND METHOD

FIELD OF THE INVENTION

The present invention relates to updating software, and more particularly to updating software independent of a network connection.

BACKGROUND OF THE INVENTION

Network security management is becoming a more difficult problem as networks grow in size and become a more integral part of organizational operations. Attacks on networks are growing both due to the intellectual challenge such attacks represent for hackers and due to the increasing payoff for the serious attacker. Furthermore, the attacks are growing beyond the current capability of security management tools to identify and quickly respond to those attacks. As various attack methods are tried and ultimately repulsed, the attackers will attempt new approaches with more subtle attack features. Thus, maintaining network security is on-going, ever changing, and an increasingly complex problem.

Computer network attacks can take many forms and any one attack may include many security events of different types. Security events are anomalous network conditions each of which may cause an anti-security effect to a computer network. Security events include stealing confidential or private information; producing network damage through mechanisms such as viruses, worms, or Trojan horses; overwhelming the network's capability in order to cause denial of service, and so forth.

In particular, the generation and spread of computer viruses is a major problem in modern day computing. Generally, a computer virus is a program that is capable of attaching to other programs or sets of computer instructions, replicating itself, and performing unsolicited or malicious actions on a computer system. Generally, computer viruses are designed to spread by attaching to floppy disks or data transmissions between computer users, and are designed to do damage while remaining undetected. The damage done by computer viruses may range from mild interference with a program, such as the display of an unwanted political message in a dialog box, to the complete destruction of data on a user's hard drive. It is estimated that new viruses are created at a rate of over 100 per month.

A variety of security application programs have been developed to detect and destroy computer viruses. As is known in the art, a common method of detecting viruses is to use a virus scanning engine to scan for known computer viruses in executable files, application macro files, disk boot sectors, etc. Generally, computer viruses are comprised of binary sequences called "virus signatures." Upon the detection of a virus signature by the virus scanning engine, a virus disinfection program may then be used to extract the harmful information from the infected code, thereby disinfecting that code.

Since various security events are constantly changing over time, there is a need to continuously update the security application programs that are used to protect against such security events. For example, new viruses require the generation and incorporation of new virus signatures in each security application program. This is often accomplished by establishing communication between client computers on which the security application programs are running, and a server equipped with the latest security updates.

The foregoing update process is effective only when the client computers are capable of being connected to the server to receive the aforementioned updates. Unfortunately, this connectivity is not available in some systems. There is thus a need for a system which is network connection-independent, while still being capable of updating software to protect against security events and for other purposes.

DISCLOSURE OF THE INVENTION

A system, method and computer program product are provided for communicating over a network without a direct connection to the network. A process is first initiated on a first computer without a direct connection to a network. In response to the process, a second computer is automatically identified, where such second computer is equipped with a direct connection to the network and is coupled to the first computer. Data is then communicated between the first computer and a server computer over the network via the direct connection of the second computer.

In one embodiment, the process may include an update process. Such update process may update data on the first computer. Still yet, the update process may update an application program on the first computer. As an option, the application program may include a security application program. Moreover, the process may request communication over the network.

In another embodiment, the second computer may be identified by automatically broadcasting an initiation request to a plurality of computers connected thereto, a portion of which have the direct connection to the network. In the context of the present exemplary embodiment, the initiation request may be received at the second computer. It should be noted that the plurality of computers with the direct network connection are adapted for load balancing a plurality of the initiation requests being made by multiple computers (i.e. the first computer) without the direct connection to the network.

To accomplish this in accordance with one aspect of the present embodiment, the second computer may determine a time out period in response to the initiation request. Further, the second computer may send a response to the initiation request after the expiration of the time out period for allowing data to be communicated between the first computer and the server computer via the second computer. Still yet, the first computer may broadcast a termination request to the plurality of computers including the second computer connected thereto upon the receipt of the response from at least one of the plurality of computers. Moreover, the second computer may be adapted for not sending the response to the initiation request if the termination request is received prior to the expiration of the time out period.

In still another embodiment, the data may be communicated by parsing a uniform resource locator (URL) for generating a modified URL. Data may then be communicated by connecting to the modified URL. Further, the data may be communicated by determining if the data must be parsed, and then parsing the data accordingly.

In still yet another embodiment, the data may be communicated via a network browser. Moreover, the browser may operate independent of the modified URL.

DESCRIPTION OF THE PREFERRED EMBODIMENTS

Figure 1:
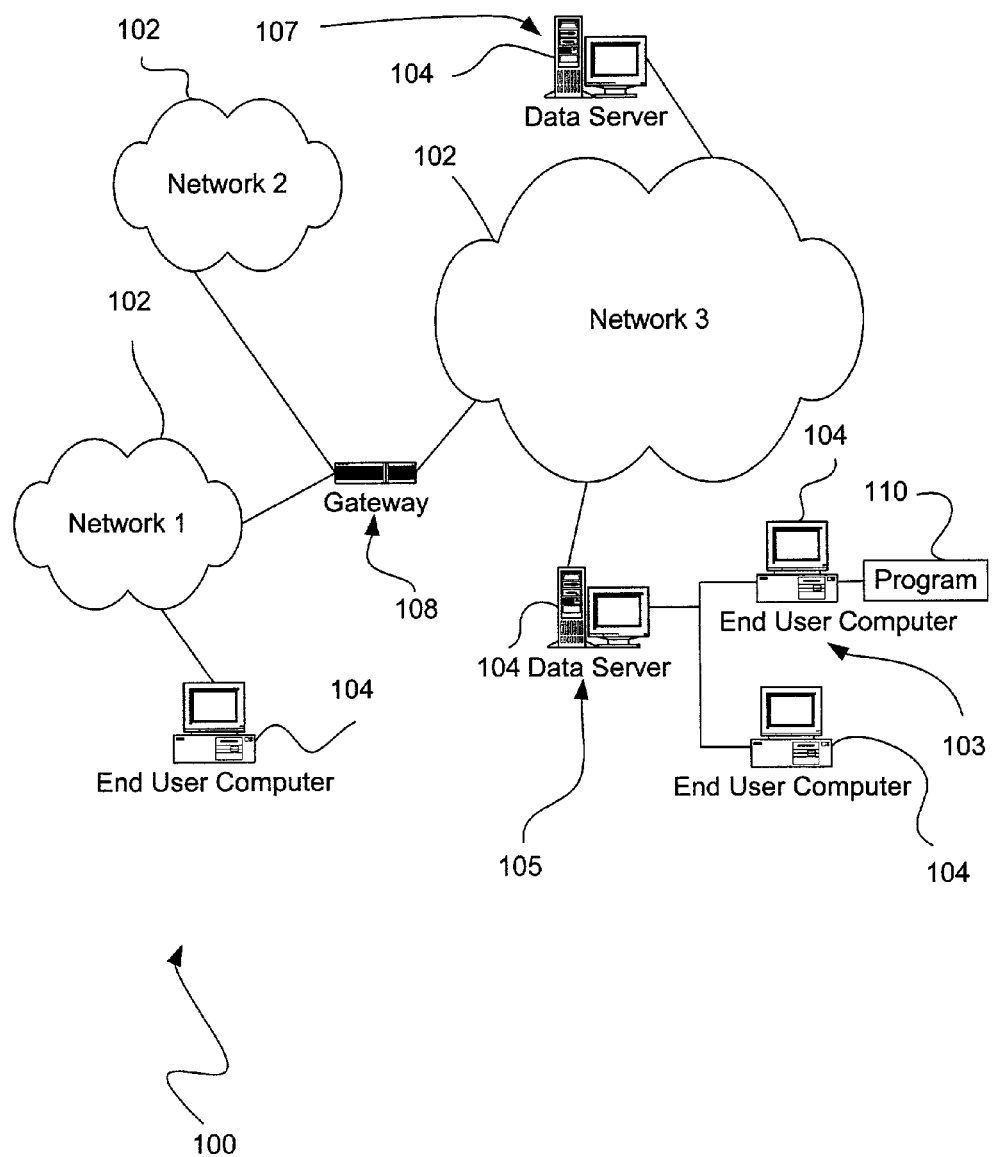
FIG. 1 illustrates a network architecture, in accordance with one embodiment.

FIG. 1 illustrates a network architecture 100, in accordance with one embodiment. As shown, a network 102 is provided. In the context of the present network architecture 100, the network 102 may take any form including, but not limited to a local area network (LAN), a wide area network (WAN) such as the Internet, etc.

Coupled to the network 102 are data servers and end user computers 104 which are capable of communicating over the network 102. In the context of the present description, such data servers and end user computers 104 may include a web server, desktop computer, lap-top computer, hand-held computer, printer or any other type of hardware/software network device. More detail regarding an exemplary embodiment of such data servers and end user computers 104 will be set forth hereinafter during reference to FIG. 2.

Installed on any one of the data servers and/or end user computers 104 is an application program 110. While the application program 110 may include any type of software that requires communication over the network 102, the application program 110 may, in one embodiment, include a security application program 110.

In such embodiment, the security application program 110 may be used to simulate an attack against one of the foregoing network devices. Such security application program 110 may probe for weaknesses by simulating certain types of security events that make up an attack. Such security application program 110 may also test user passwords for suitability and security. Of course, the security application program 110 may be used to identify any type of vulnerabilities of a system.

Still yet, the security application program 110 may detect attacks or intrusions by scanning communications between the various foregoing network devices. Of course, the security application program 110 may also be capable of scanning executable files, application macro files, disk boot sectors, etc. This scanning may include comparing the communications, etc. with a plurality of virus or other attack signatures. Upon the detection of a signature by the security application program 110, a remedying event may then be used to report the problem, quarantine the infected communications, and/or extract the harmful information from the infected communications, thereby disinfecting the communications.

While the security application program 110 may include or exclude any combination of the foregoing functionality, the security application program 110 may also take on any other unmentioned security-related responsibilities. Further, such security application program 110 may be updated with upgraded software and/or data to enhance such security-related responsibilities.

In use, the application program 110 on a first one of the computers 103 may communicate over the network 102 without a direct connection to the network 102 for various purposes (i.e. updating purposes, etc.). To accomplish this, a second one of the computers 105 coupled to the first computer 103 and equipped with a direct connection to the network 102 is automatically identified. Data is then communicated between the first computer 103 and a third computer 107 (i.e. a server) over the network 102 via the direct connection of the second computer 105. This may be accomplished seamlessly. Moreover, load balancing may be employed to ensure that multiple computers 104 without a direct network connection may effectively communicate over the network 102 via a select few of computers with the direct network connection. More information regarding one exemplary implementation of the present embodiment will be set forth hereinafter in greater detail.

Figure 2:
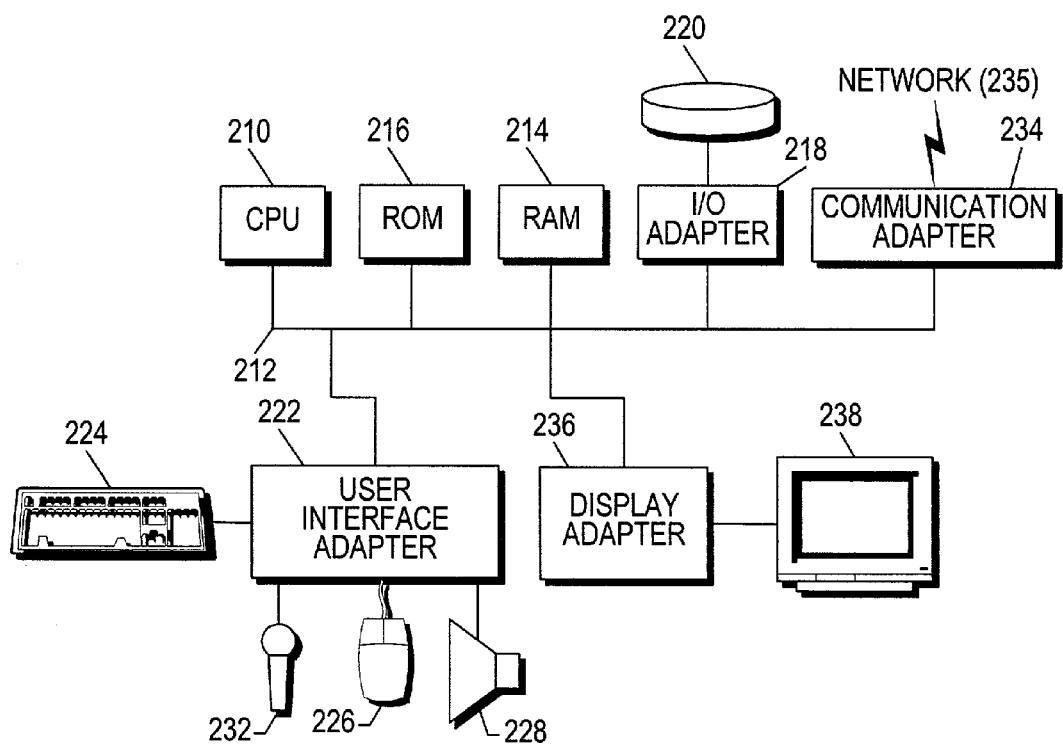
FIG. 2 shows a representative hardware environment that may be associated with the data servers and/or end user computers of FIG. 1, in accordance with one embodiment.

FIG. 2 shows a representative hardware environment that may be associated with the data servers and/or end user computers 104 of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3A:
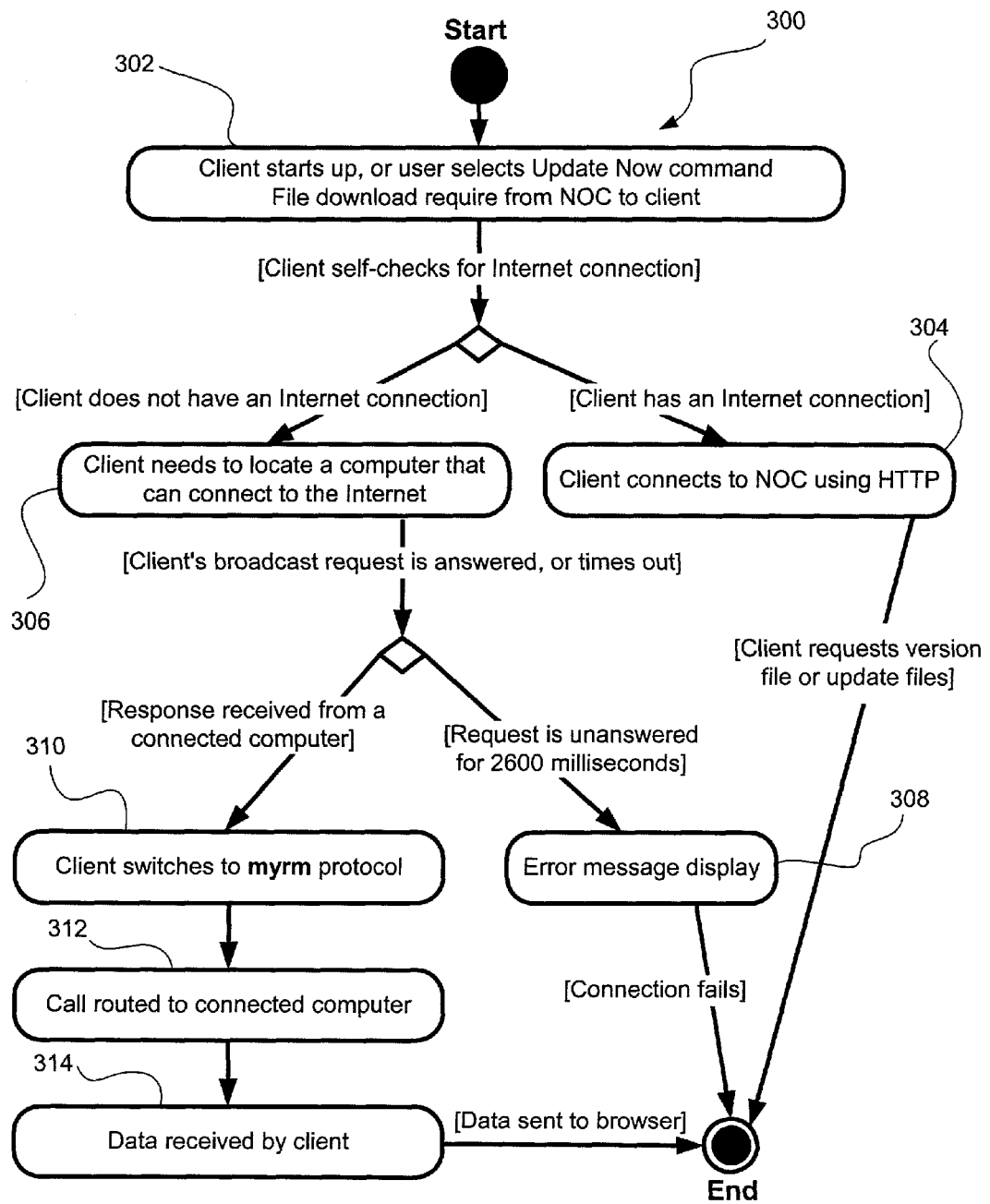
FIGS. 3A and 3B illustrate methods for communicating over a network without a direct connection to the network, in accordance with one embodiment.
Figure 3B:
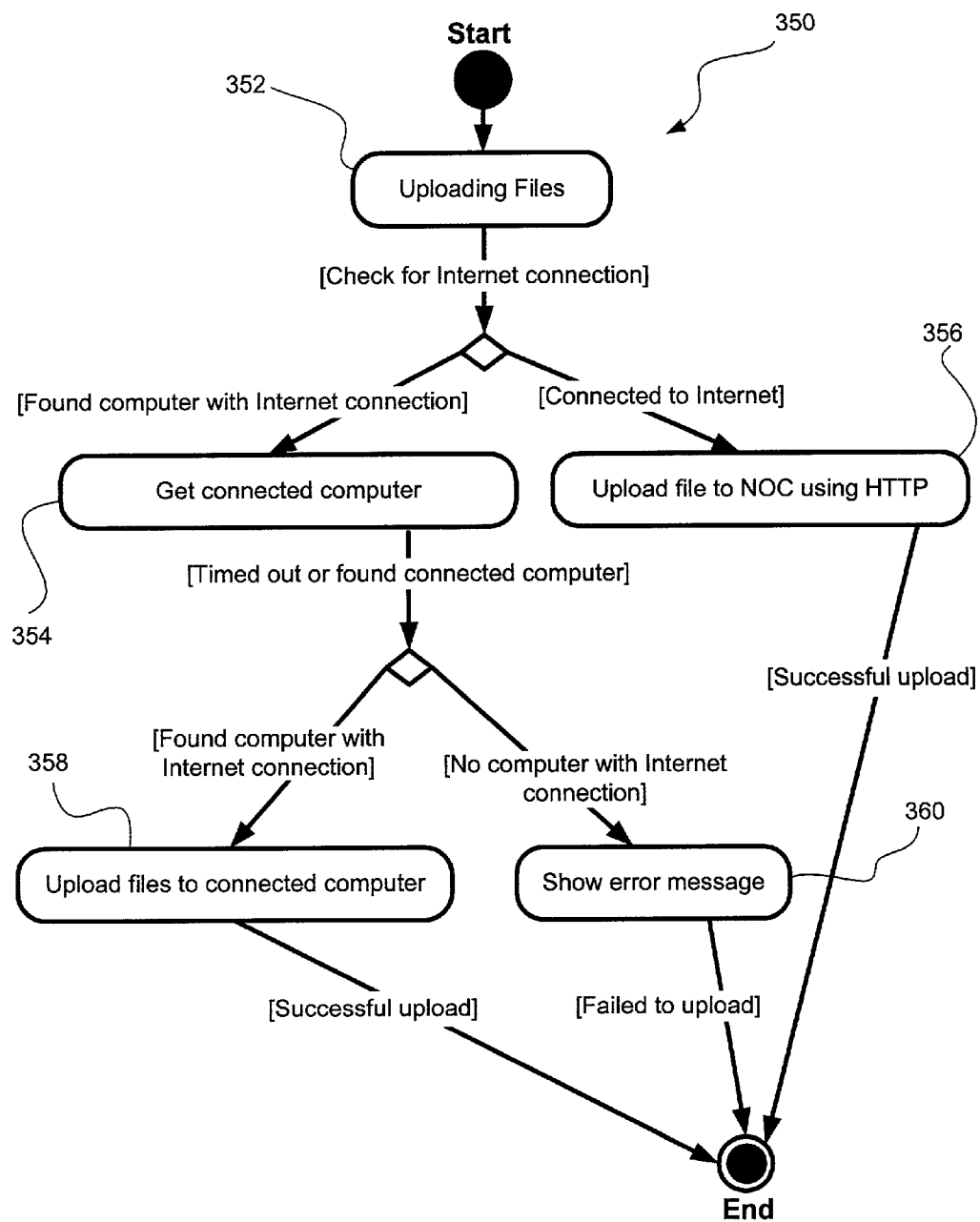

FIGS. 3A and 3B illustrate methods for communicating over a network without a direct connection to the network, in accordance with one embodiment. In particular, FIG. 3A illustrates a method 300 for downloading data and FIG. 3B illustrates a method 350 for uploading data without the direct connection to the network. As an option, the present methods may be carried out in the context of the network architecture 100 of FIG. 1. Of course, however, the present methods may be executed in any desired context and environment.

With reference first to the method 300 of FIG. 3A, a computer (see, for example, computer 104 of FIG. 1) performs a self-check to determine if the computer has a connection to a network (see, for example, network 102 of FIG. 1) such as the Internet for communication with a server or a network operation center (NOC). This may be accomplished when the computer starts up, when a user selects an update menu option, or as a continuous or periodic process. See operation 302.

If the computer has a connection, it then connects directly to the network using a predetermined protocol such as hypertext transfer protocol (HTTP). See operation 304. If the computer does not have a connection, it broadcasts a connection lookup request. See operation 306. If the search for a connected computer does not produce a response within a predetermined amount of time (i.e. 2600 milliseconds), an error message is displayed in operation 308. In other words, the broadcast is determined to have failed after a request time out. More information regarding such connection process will be set forth in greater detail during reference to FIG. 4.

If, however, the search locates a connected computer, a resource request is converted to another protocol (i.e. a "myrm" protocol), and the request is routed to the connected computer, which receives the requested data and forwards it to the requesting computer. See operations 310-314. More information regarding such communication process will be set forth in greater detail during reference to FIG. 5.

With reference now to the method 350 of FIG. 3B, before a computer can download updates from a network, it may first upload information about its properties (client system data, unique identifying information, current configuration, installed software, etc.) and events (virus detections, agent attempts to connect to the network, etc.). See operation 352. Before a computer can upload, it first performs a self-check to determine if it has a connection to a network such as the Internet. If the computer has a connection, it connects directly to the network using a predetermined protocol such as HTTP. The upload then proceeds successfully in operation 356. If the computer does not have a direct connection, it broadcasts a connection lookup request in a manner that will soon be set forth. Note operation 354.

If the search for a connected computer does not produce a response within a predetermined amount of time (i.e. 2600 milliseconds), an error message is displayed, and the broadcast fails. Note operation 360. If, however, the search locates a connected computer, the files are uploaded to the files to the connected computer, which, in turn, uploads the file to a server on the network. See operation 358. The aforementioned protocol (i.e. the "myrm" protocol) may not necessarily be involved in this process because the uploading of files may not involve the browser.

Figure 4:
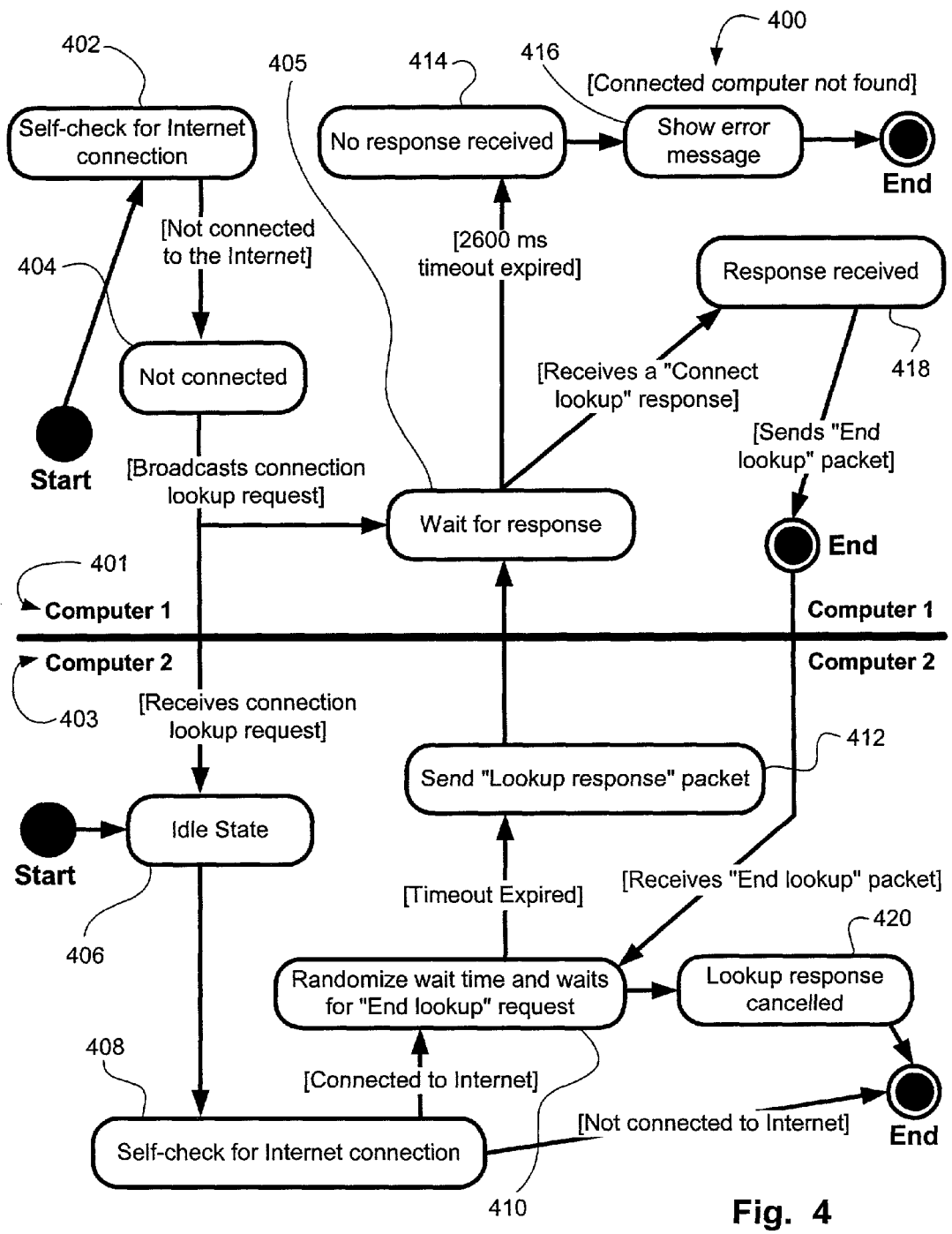
FIG. 4 illustrates a method for communicating over a network without a direct connection to the network, in accordance with another embodiment.

FIG. 4 illustrates a method 400 for communicating over a network without a direct connection to the network, in accordance with one embodiment. As shown, operations of two computers, a first computer 401 and a second computer 403, are set forth. It should be noted that the present method 400 may be carried out using the network architecture 100 of FIG. 1. Of course, however, the present method 400 may be executed in any desired context and environment.

Starting with the operation of the first computer 401, it is automatically determined in operation 402 whether the first computer 401 has a direct connection to a network.

The foregoing determination may be prompted by any desired process. In one embodiment, the process may include an update process. Such update process may update data on the first computer 401. Still yet, the update process may update an application program on the first computer 401. As an option, the application program may include a security application program. Table 1 illustrates various exemplary processes that may require network access.

TABLE 1

| Function | Description |
| --- | --- |
| Update check | All computers in the subnet must retrieve a version file [sometimes referred to as catalog file) from the NOC. The information in the version file is a road-map, indicating the most current version of the program files (virus definition, or DAT files, upgraded engine, etc] |

TABLE 1-continued

| Function | Description |
| --- | --- |
| | available for download. When the system compares the contents of the version file with the version information of the program files already installed, it broadcasts a request for the updated files that it requires. Only one computer in the subnet must retrieve the updated program files from the NOC. Then, other computers in the subnet can retrieve the updated program files from any computer in the subnet that has already retrieved them. |
| Entitlement check | When the agent connects to the NOC to check for updates, it passes an entitlement key to the NOC. The agent can download updates only if it has a valid entitlement key. |
| Event reporting | Events, such as virus detections, or attempts to connect to the NOC, are uploaded to the NOC, where they are imported into a reporting database. |
| News about the latest virus threats Links in the user interface | After a successful update, a list of latest virus threats appears on the client workstation. This display includes a link to the Virus Library. The Interface and the Help system contain several links to the service provider's web site or other URLs. For example, the logo at the top of the interface windows is a link to the NOC. The phrase protected by is a link to the ASaP web site. |
| Help/Virus library information | A wider assortment of informational and instructional topics is available on the web site than is included in the limited online help installed on the workstation. |
| Exclusion tool | This tool allows the administrator to exclude particular files or folders from scanning. |
| Push installation | This tool allows the administrator to push installation of the agent to any computer on the LAN. |
| Quarantine Viewer | The tool allows the workstation user to view the names of infected files that have been uploaded to the NOC for closer examination. Internet connectivity is required to upload the infected file to the NOC. |

It should be noted that this determination may be prompted by any desired process using the computer (i.e. a start-up process, an update process, an installation process, periodic process, any normal process, etc.).

If it is determined that the first computer 401 does not have the direct connection to the network (see operation 404), an initiation request is automatically broadcasted to a plurality of computers connected thereto. In one embodiment, such broadcast may be limited to a subnet of computers at least one of which has a direct connection to a network such as the Internet.

Moving to a perspective of the second computer 403, the initiation request is received while the second computer 403 is an idle state in operation 406. It is then determined whether the second computer 403 has a direct connection to the network, as indicated in operation 408.

For the sake of the present description, the second computer 403 has a direct connection to a network such as the Internet which, in turn, is coupled to a server with which the first computer 401 wishes to communicate. It should be noted, however, that the initiation request may be received by a plurality of computers some of which have direct connections and some of which do not. Thus, many others computers may be capable of operating in a manner similar to the first computer 401 and the second computer 403 set forth herein.

If it is determined that the second computer 403 has a direct connection to the network, a time out period is determined in operation 410. Upon expiration of the time out period, a response to the initiation request is sent from the second computer 403 to the first computer 401 indicating that the second computer 403 has a direct connection. Note operation 412.

With reference again to the operation of the first computer 401, the response is received in operation 405 which prompts the transmission of a termination request to the plurality of computers connected thereto. Note operation 418. It should be noted that an error message is displayed in operation 416 if it is determined that a response has not been received by a predetermined amount of time (i.e. 2600 milliseconds) in operation 414.

By sending the termination request to the plurality of computers connected thereto in operation 418, the first computer 401 informs any other computer that may send a response to terminate any time out pending. Note operation 420. In other words, if another computer with a direct connection responds to the first computer 401 before the second computer 403, the time out process of the second computer 403 is terminated.

Thus, by varying the time out based on a load on a particular computer such as the second computer 403, a system may be load-balanced by the present method 400. In particular, the present method 400 randomizes the length of time it waits to receive a termination request. This allows for the possibility that another computer, or multiple computers in the subnet, have network access. Depending on the size of the subnet and the number of connected computers, randomized wait times provide load balancing among the connected computers.

Communication between the first computer 401 and a server computer is then established over the network via the direct connection of the second computer 403. More information regarding such process will be set forth in greater detail during reference to FIG. 5.

Figure 5:
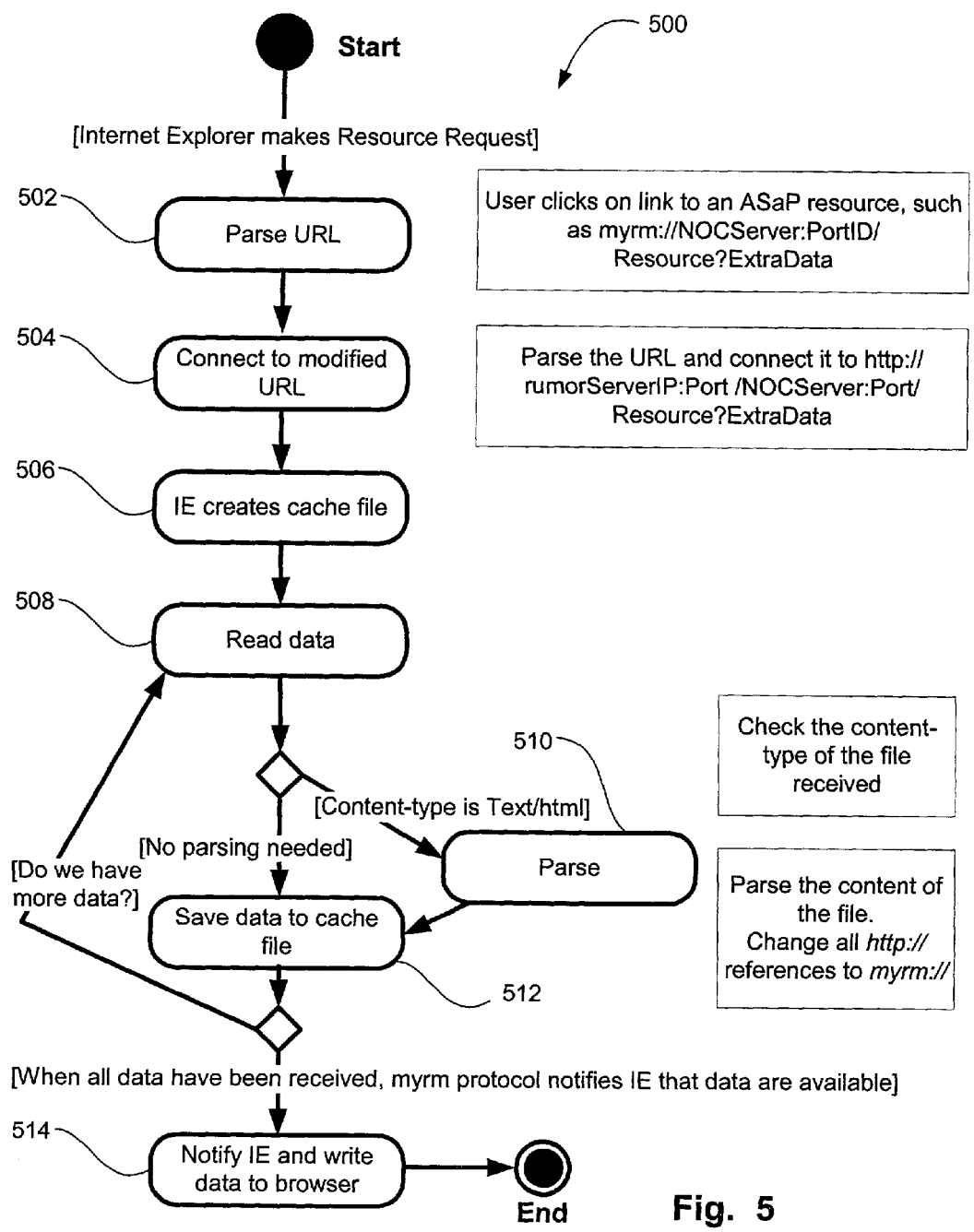
FIG. 5 shows a method for allowing communication between a first computer without a direct connection to a network and a server via a second computer with such a direct connection to the network.

FIG. 5 shows a method 500 for allowing communication between a first computer without a direct connection to a network and a server via a second computer with such a direct connection to the network. In one embodiment, such method 500 may be executed in the context of the method 400 of FIG. 4. Of course, however, the present method 500 may be executed in any desired context.

Initially, a request for access to a server via a network is made utilizing a network browser (i.e. MICROSOFT® INTERNET EXPLORER®). In operation 502, a uniform resource locator (URL) is parsed for generating a modified URL, a connection is made to the modified URL in operation 504. For example, a user may initiate a link to a predetermined server at "myrm://NOCServer:PortID/Resource?ExtraData." Such requested URL is then converted to an equivalent using another protocol such as HTTP. In the context of the present example, the link may be converted to "http://rumorServerIP:Port/NOCServer:Port/Resource?ExtraData." Thus, a key word is dropped. In one embodiment, a WinINET™ application program interface (API) may be used for such purpose.

Data from the URL may be cached in operation 506 for being read in operation 508. If the data type has a predetermined format [i.e. TXT or Hypertext Markup Language (HTML)], the data may be converted (i.e. converting all http://references to myrm://references, for example). See operation 510. Parsing may be needed for HTML pages that contain hyperlinks to resources (i.e. HTTP resources) that need to be transformed to a predetermined protocol (i.e. myrm protocol).

After being parsed, the data may be saved to the cache file in operation 512. If the content type does not require parsing, the data is simply saved to the cache file. The data is then read repeatedly until all data has been saved to the cache file. The data may then be sent to the browser for display purposes in operation 514.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing updates to a computer, comprising:
   initiating a process on a first computer, the first computer having a connection to a local subnet;
   determining if the first computer is directly connected to an external network in response to the initiation of the process;
   sending data, by the first computer, to a server computer over the external network if the first computer is determined to have a direct connection to the external network, wherein the act of sending data includes parsing a URL to generate a modified URL, and wherein the act of generating a modified URL includes converting the URL from a first protocol to a second protocol;
   automatically attempting to identify, by the first computer, a second computer connected to the local subnet having a direct connection to the external network if the first computer is determined not to have a direct connection to the external network, wherein the act of attempting to identify the second computer includes broadcasting a connection lookup request to each of a plurality of computers connected to the local subnet;
   sending data, by the first computer, to the server computer over the external network via the direct connection of the second computer if the first computer identifies the second computer as having a direct connection to the external network; and
   displaying, by the first computer, an error message on the first computer if none of the plurality of computers connected to the local subnet responds to the connection lookup request within a specified time period,
   wherein the process includes an update process for updating at least one aspect of the first computer with at least one of software and data that is communicated between the first computer and the server computer.

2. The method as recited in claim 1, wherein the update process updates data on the first computer.

3. The method as recited in claim 1, wherein the update process updates an application program on the first computer.

4. The method as recited in claim 3, wherein the application program includes a security application program.

5. The method as recited in claim 4, wherein the security application program is used to simulate an attack on the first computer, test computer passwords on the first computer, identify at least one vulnerability of the first computer, scan executable files on the first computer, scan application macro files on the first computer, and scan disk boot sectors on the first computer.

6. The method as recited in claim 1, wherein the process requires communication over the external network.

7. The method as recited in claim 1, wherein the plurality of computers are adapted for load balancing a plurality of the connection lookup requests.

8. The method as recited in claim 7, wherein the load balancing includes the second computer determining a time out period in response to each of the connection lookup requests.

9. The method as recited in claim 8, wherein the second computer sends a response to each of the plurality of connection lookup requests after the expiration of the time out period for allowing data to be communicated between the first computer and the server computer via the second computer.

10. The method as recited in claim 9, wherein the first computer broadcasts a termination request to each of the plurality of computers connected to the local subnet upon the receipt of the response from at least one of the plurality of computers.

11. The method as recited in claim 10, wherein the second computer is adapted for not sending the response to the connection lookup request if the termination request is received prior to the expiration of the time out period.

12. The method as recited in claim 8, wherein the time out period determined by the second computer is varied based on a load of the second computer.

13. The method as recited in claim 1, wherein the data is communicated by connecting to the modified URL.

14. The method as recited in claim 13, wherein the data is communicated via a network browser.

15. The method as recited in claim 14, wherein the browser operates independent of the modified URL.

16. The method as recited in claim 1, wherein the data is communicated by determining if the data must be parsed.

17. The method as recited in claim 16, wherein the data is communicated by parsing the data if it is determined that the data must be parsed.

18. The method as recited in claim 17, wherein parsing the data includes changing all references of the second protocol to the first protocol.

19. The method as recited in claim 18, wherein after parsing the data, the data is saved to a cache file and a browser is notified by the first protocol that the data is available.

20. The method as recited in claim 1, wherein the first computer uploads information about properties and events thereof prior to the update process.

21. The method as recited in claim 20, wherein the properties include client system data, unique identifying information, current configuration, and installed software.

22. The method as recited in claim 20, wherein the events include virus detections and agent attempts to connect to the network.

23. The method as recited in claim 1, wherein the first protocol includes a predetermined protocol and the second protocol includes a http protocol.

24. A computer program product embodied on a non-transitory computer readable medium, comprising:
  computer code for initiating a process on a first computer, the first computer having a connection to a local subnet;
  computer code for determining if the first computer is directly connected to an external network in response to the initiation of the process;
  computer code for sending data, by the first computer, to a server computer over the external network if the first computer is determined to have a direct connection to the external network, wherein the act of sending data includes parsing a URL to generate a modified URL, and wherein the act of generating a modified URL includes converting the URL from a first protocol to a second protocol;
  computer code for automatically attempting to identify, by the first computer, a second computer connected to the local subnet having a direct connection to the external network if the first computer is determined not to have a direct connection to the external network, wherein the act of attempting to identify the second computer includes broadcasting a connection lookup request to each of a plurality of computers connected to the local subnet;
  computer code for sending data, by the first computer, to the server computer over the external network via the direct connection of the second computer if the first computer identifies the second computer as having a direct connection to the external network; and
  computer code for displaying, by the first computer, an error message on the first computer if none of the plurality of computers connected to the local subnet responds to the connection lookup request within a specified time period,
  wherein the process includes an update process for updating at least one aspect of the first computer with at least one of software and data that is communicated between the first computer and the server computer.

25. A method for providing updates to a computer, comprising:
  automatically determining whether a first computer has a direct connection to a network;
  sending data from the first computer to a server computer over the network if it is determined that the first computer has the direct connection to the network;
  automatically broadcasting an initiation request from the first computer to a plurality of computers connected thereto if it is determined that the first computer does not have the direct connection to the network;
  receiving a response to the initiation request at the first computer from a second computer, the second computer being one of the plurality of computers connected to the first computer, wherein the response is received after a time out period;
  broadcasting a termination request to the plurality of computers connected thereto upon receiving the response at the first computer; and
  establishing communication between the first computer and the server computer over the network via the direct connection of the second computer by the following operations at the first computer:
    parsing a uniform resource locator (URL) for generating a modified URL,
    connecting to the modified URL,
    creating a cache file utilizing a network browser,
    communicating data with the server computer via the modified URL,
    determining if the data must be parsed,
    parsing the data if it is determined that the data must be parsed, and
    displaying the data on the network browser,
  wherein at least one aspect of the first computer is updated with at least one of software and the data that is communicated between the first computer and the server computer,
  wherein generating the modified URL includes converting the URL from a first protocol to a second protocol.

* * * * *

UNITED STATES PATENT AND TRADEMARK OFFICE
CERTIFICATE OF CORRECTION

| | | |
|---|---|---|
| PATENT NO. | : 8,140,642 B1 | Page 1 of 1 |
| APPLICATION NO. | : 10/150608 | |
| DATED | : March 20, 2012 | |
| INVENTOR(S) | : Kadam et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,594 days.

Signed and Sealed this
Fourteenth Day of August, 2012

David J. Kappos
*Director of the United States Patent and Trademark Office*